W. ROTTER & R. S. ARTHUR.
PHONOGRAPH MECHANISM.
APPLICATION FILED JULY 1, 1914.
1,167,842.
Patented Jan. 11, 1916.
7 SHEETS—SHEET 5.
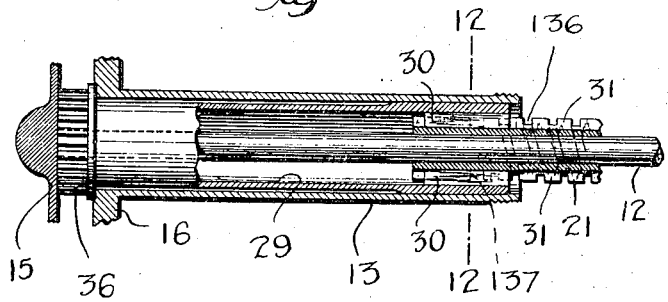
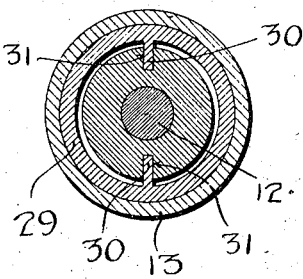
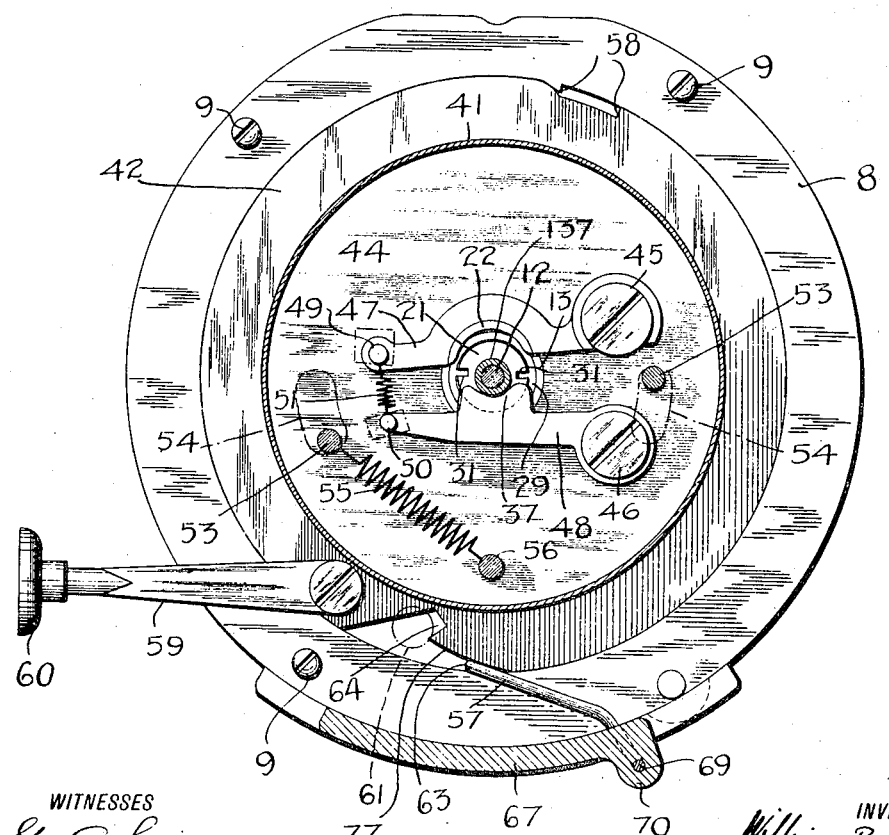
WITNESSES
INVENTORS
ATTORNEY

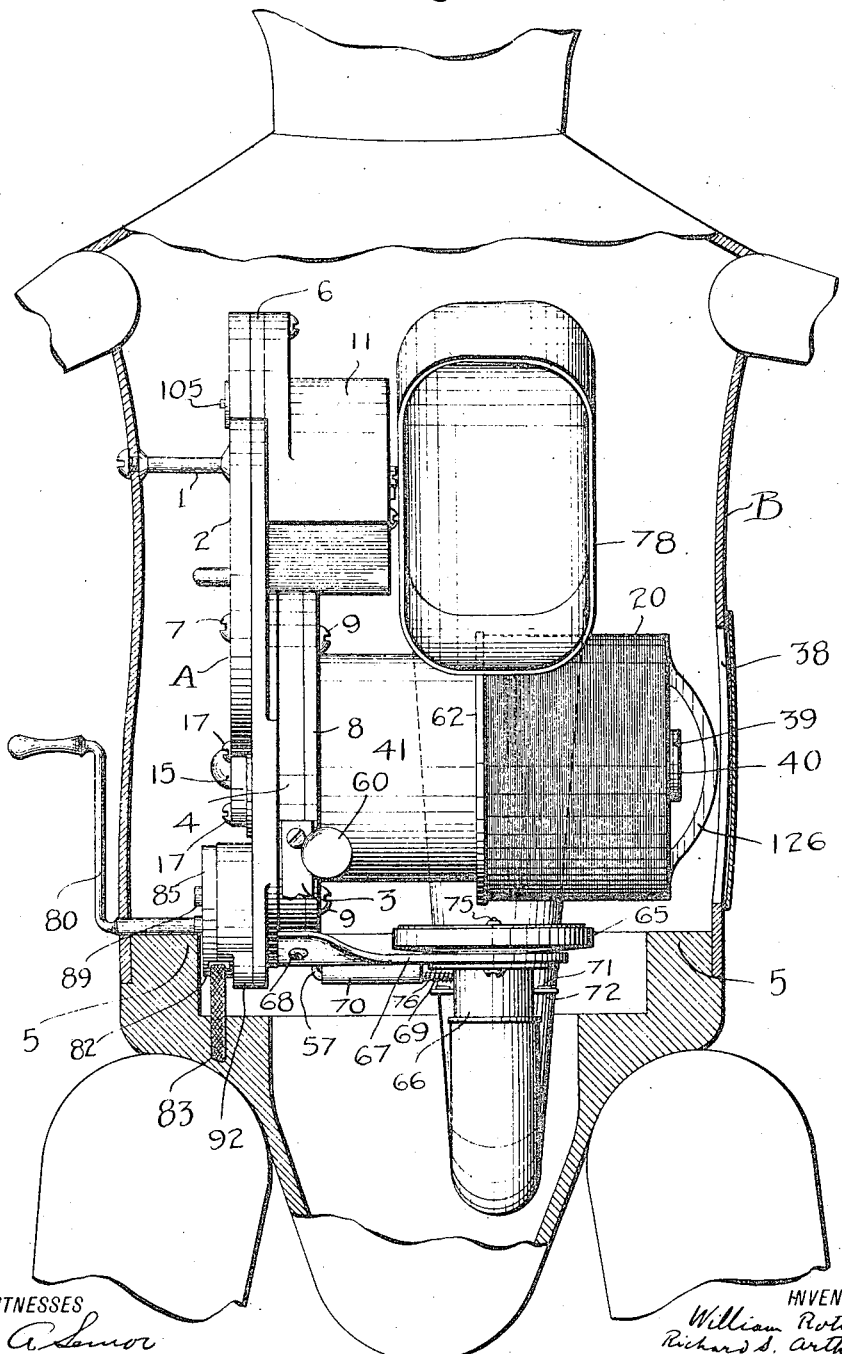

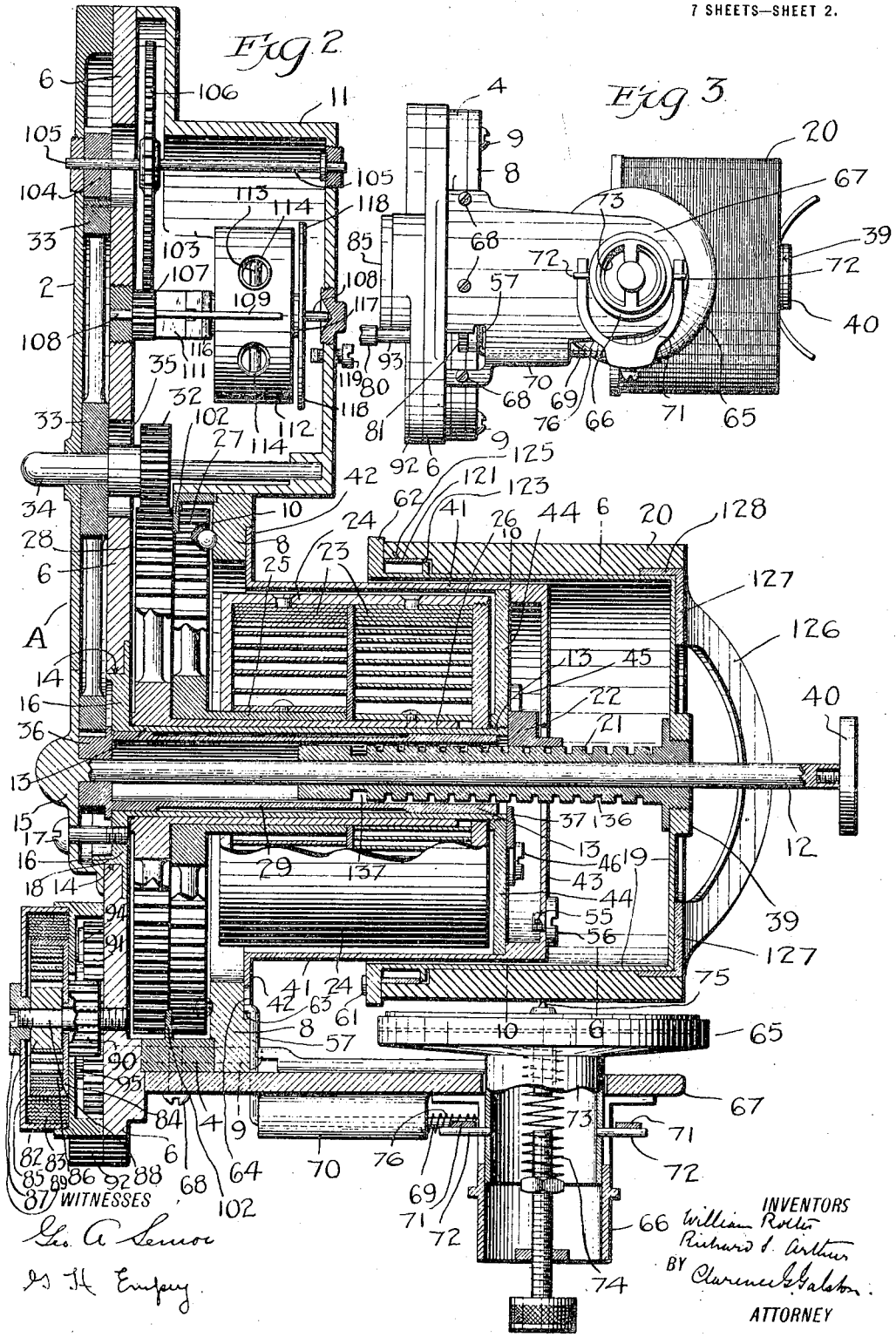

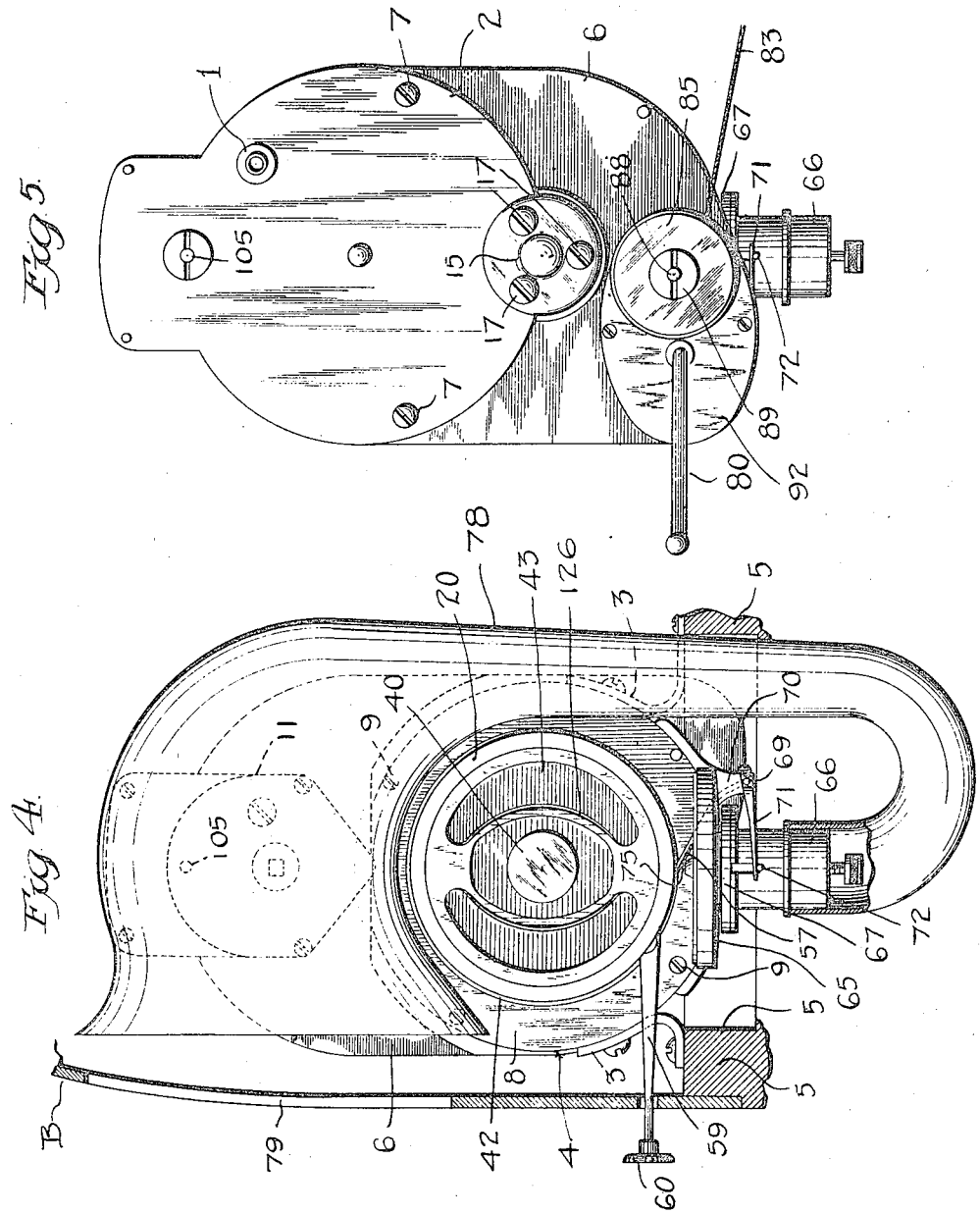

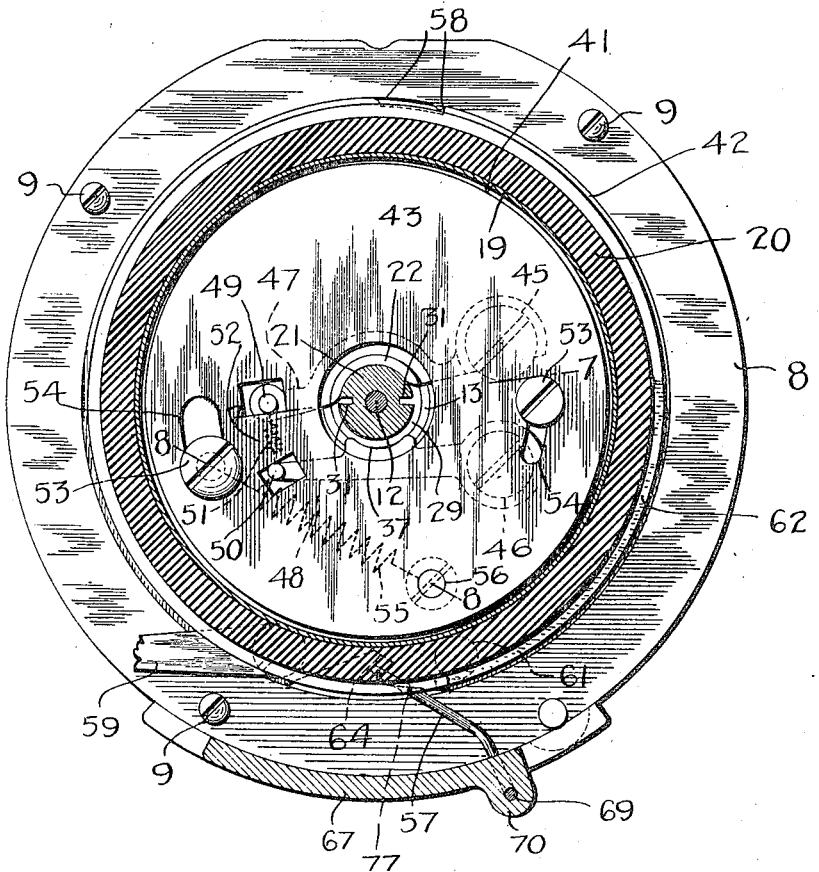
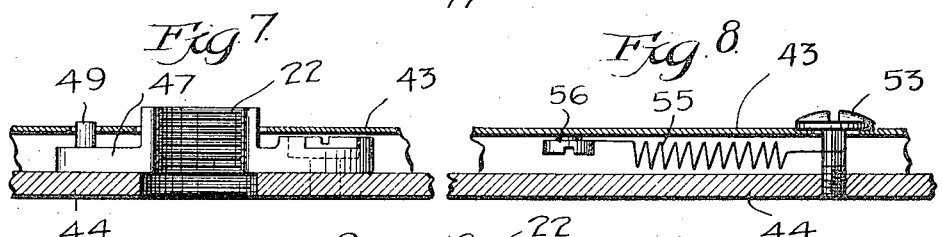
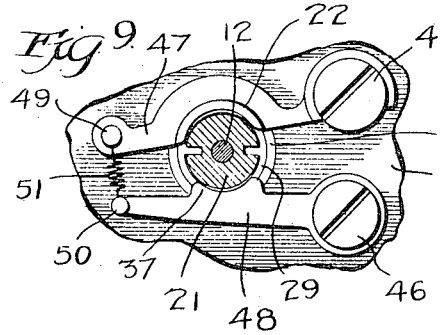

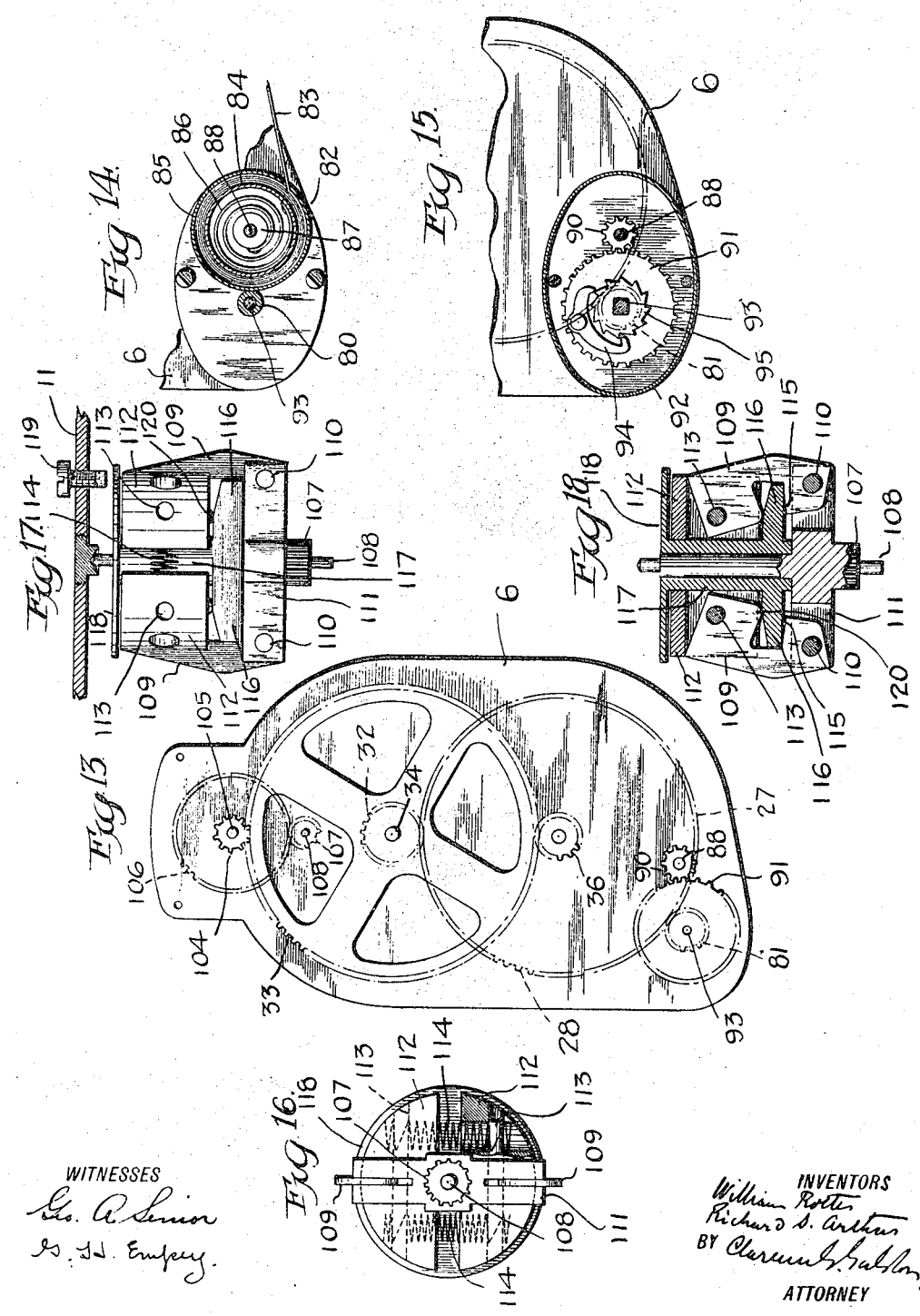

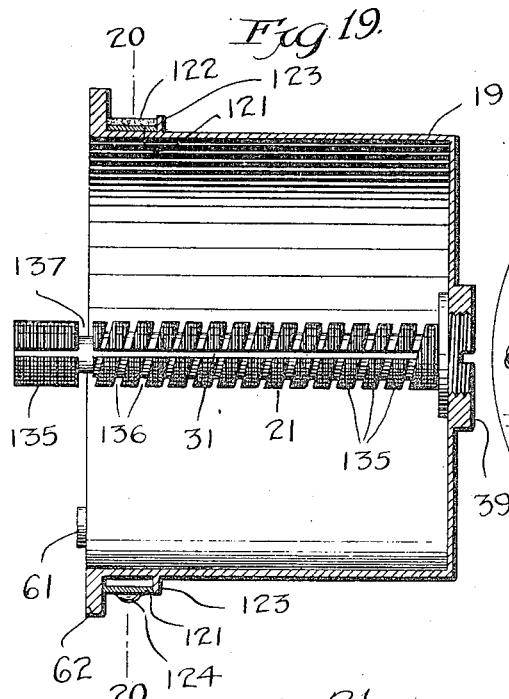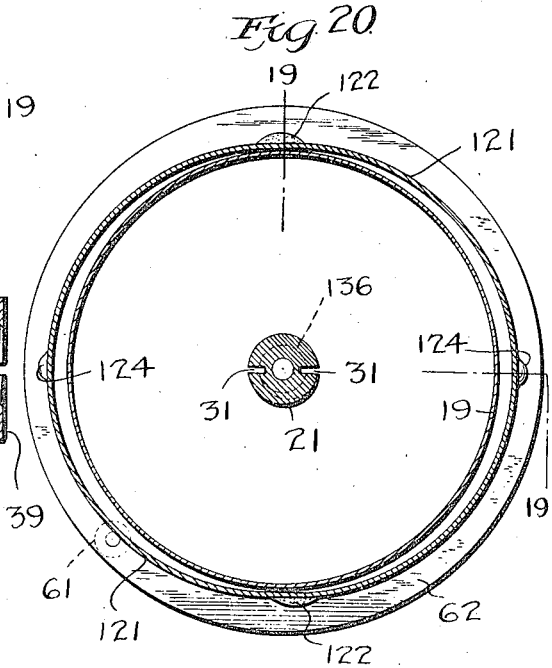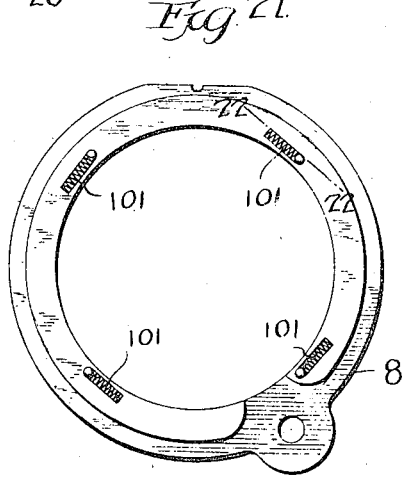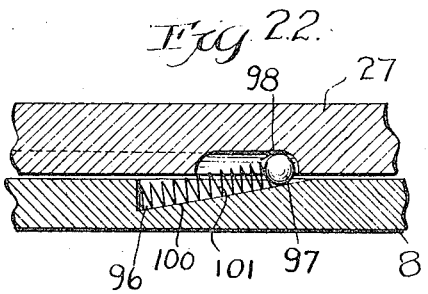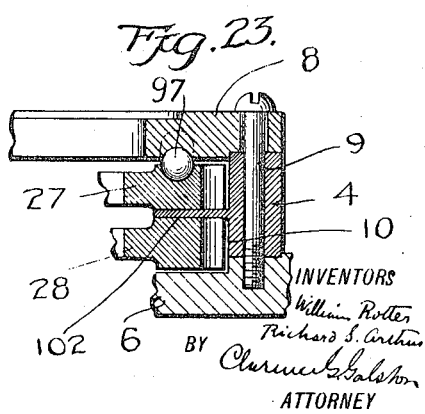

UNITED STATES PATENT OFFICE.

WILLIAM ROTTER AND RICHARD S. ARTHUR, OF NEW YORK, N. Y., ASSIGNORS TO TALKING DOLL & NOVELTY COMPANY, INC., OF NEW YORK, N. Y.

PHONOGRAPH MECHANISM.

1,167,842.  Specification of Letters Patent.  Patented Jan. 11, 1916.

Application filed July 1, 1914. Serial No. 848,340.

*To all whom it may concern:*

Be it known that we, WILLIAM ROTTER and RICHARD S. ARTHUR, residents of the borough of Bronx, city of New York, county of Bronx, and State of New York, citizens of the United States, have invented an Improvement in Phonograph Mechanism, of which the following is a specification.

The invention comprises certain improvements in phonograph mechanism, having as objects, among others, to effect a material simplification of such mechanisms, to secure compactness in the construction and relation of the elements, to insure strength and rigidity in the structural parts,—more especially in apparatus where the mechanism is carried in projecting relation from a support,—to enable the apparatus to be quickly and easily assembled and parts to be readily replaced in event of breakage, to render it in a high degree automatic without introducing complications, to facilitate the insertion and removal of records, and to make the apparatus proof against meddlesome or unskilled manipulation.

A highly important feature of the invention resides in the co-axial relation of the parts, whereby, in particular, the record or record support is rotatable around the spring driving means, thus making possible a substantial economy in the amount of space occupied; and, while the invention is more particularly concerned with mechanisms of the cylinder record type, it will be understood that the said feature is not necessarily limited thereto.

Another leading feature is the construction of the thread-bar with a reverse or return thread, in addition to the feed thread, together with means whereby this thread operates automatically to restore the record drum or reproducer, though preferably the former, to normal position upon conclusion of the playing of the record. A feed-nut and a dog coöperate with the double-thread feed-bar, the dog to engage the return thread, which is deeper and steeper than the regular thread; and means are provided for causing these members to engage alternately with the respective threads the nut being disengaged and the dog engaged, automatically at the end of playing. A simple and effective form of device reliably holds the records on the drum and permits their insertion and removal merely by slipping them on and off, the possibility of error in placing the wrong end over the drum being also eliminated.

These and numerous other important features and principles will become apparent to those skilled in the art as the specification proceeds.

The mechanism is more particularly designed for installation in small form in dolls or other toys, clocks, etc., as illustrated for example in Figure 1 of the accompanying drawings, its compact and sturdy construction, its ability to perform equally well in any position, and the simplicity of its operation especially fitting it for such uses. It will be manifest, however, that the apparatus may be made on a larger scale, and that part or all of its features may be applied with advantage in numerous specifically different ways, for example, in the production of so-called hornless or cabineted machines of small size or of variable external shapes and proportions.

A feature of the mechanism which contributes to the flexibility of external design as well as to the securing of desirable acoustic effects, consists in the possibility of disposing the reproducer at any or various points around the record drum, together with the consequent freedom in the matter of the disposition of the sound conveyer or amplifier. In the particular instance herein shown the reproducer is located below the record drum, while the sound conveyer extends around and above the same, though it will be understood that this orientation is not necessarily fixed, since in the case of a talking doll, for example, the mechanism as a whole may be disposed in any position according to the manner in which the doll is held.

In the accompanying drawings illustrating the invention by means of the embodiment at present believed to be preferable for use in dolls: Fig. 1 is a front elevation of the mechanism in the body of a doll, the doll body being partially sectioned and partially broken away; Fig. 2 is a vertical section through the mechanism, taken in the plane of its main axis, the scale being considerably larger than that of Fig. 1; Fig. 3 is a bottom plan view of the mechanism, on the scale of Fig. 1; Fig. 4 is an elevation looking at the right-hand end of Fig. 1; Fig. 5 is a reverse end elevation; Fig. 6 is a section on the line 6—6 of Fig. 2; Figs. 7 and 8 are sections on the lines 7—7 and 8—8 of Fig. 6; Fig. 9 is a fragmentary elevation showing the feed-nut and return dog in midposition, wherein the thread-bar is free to be withdrawn; Fig. 10 is a section on the line 10—10 of Fig. 2; Fig. 11 is a detail view showing the central portion of the mechanism partly in section in the plane of the axis and partly in elevation; Fig. 12 is an enlarged cross-section on the line 12—12 of Fig. 11; Fig. 13 is an elevation of the supporting wall, indicating the gearing in a semi-diagrammatic manner; Figs. 14 and 15 are detail sectional views illustrative of the spring tape winder; Fig. 16 is an end view of the governor, partly broken away and in section; Fig. 17 is a side elevation of the governor; Fig. 18 is a central longitudinal section therethrough; Fig. 19 is a section on the line 19—19 of Fig. 20; Fig. 20 is a cross-section through the record drum on the line 20—20 of Fig. 19; Fig. 21 is an inner face view of the plate bearing the balls which hold the winding gear against reverse movement; Fig. 22 is an enlarged section on the line 22—22 of Fig. 21, representing the winding gear; and Fig. 23 is a detail sectional view showing the winding and driving gears and one of the ball devices.

In the particular embodiment of the invention illustrated in these views, the supporting part of the mechanism consists in the main of an upright wall or flat casing structure A, which may, however, be disposed horizontally, as a base or platform, or in any other manner. As more particularly illustrated in Fig. 1, it may be fixed within the body B of the doll by means of a stud 1 connecting a cover plate 2, forming part of the structure, with one side of the doll body, and brackets 3 secured to an annular plate 4, also part of the structure and bearing upon a suitable ledge or shoulder 5 in the torso of the doll. Manifestly the form and location of the connections for holding the supporting structure in place may be widely varied. Such supporting structure preferably comprises a wall or plate 6 having gear casings at opposite sides, the cover plate 2, which is hollow, coöperating with the plate to which it is secured by screws 7 to form an outer casing, and annular plates 4 and 8 secured by screws 9 to the inner side of the main plate forming a gear casing 10. A governor casing 11 is shown disposed at the same side as the gear casing 10 and above the latter, but it may be positioned elsewhere if desired with a slight rearrangement of the gearing.

A central axle or fixed shaft 12 and a hollow axle or shaft 13 extending from the supporting structure constitute projecting bearing means for supporting the main elements of the mechanism. The wall 6 is provided with an opening 14. The fixed ends of the central and hollow axles are provided with a cap and basal portion 15 and 16, respectively, which clamp against opposite sides of the plate around this opening and are drawn together by means of screws 17. The basal portion 16 has a partially cylindrical flange 18 which fits the said opening and the interior of the cap 15, so as to center the parts. The cap 15, which is hollow and set into a cut-away portion of the cover plate 2, coöperates with this cover plate and with the basal portion 16 to form an extension of the external gear casing, the wall of the cap and the flange 18 being appropriately cut away at the junction with the cover plate 2.

The central axle 12 bears the record support 19, and the hollow or outer axle 13 supports the spring driving means therefor. The record 20 is preferably of the cylinder type, and the record support is in the form of a hollow drum or cylinder. The inner axle projects beyond the outer axle a distance approximately equal to the length of the drum. The drum is secured to and encircles a thread-bar 21, which is rotatable and slidable on the axle 12 and coöperates with a feed-nut 22 to feed the record from the starting position shown in Fig. 1 inward over the spring driving means.

The driving spring 23, preferably of the tandem variety, is housed within a spring barrel 24, to which the outer ends of the two halves of the spring are secured, their inner ends being secured, respectively, to concentric sleeves 25 and 26 turning about the hollow axle 13, one end of the spring barrel being journaled on the sleeve 25 and the other end thereof on the outer part of the hollow axle. Winding and driving gears 27 and 28, respectively, are fixed to the sleeves 25 and 26 and are housed within the gear casing 10.

The central opening through the spring driving means and within the hollow axle 13 accommodates a driving connection or telescopic shaft, consisting, in the present instance, of the thread-bar or spindle 21 and a rotary sleeve 29, the latter journaled on the inner surface of the hollow axle 13. The thread-bar 21 has driving engagement with the sleeve 29, but is free to slide axially with reference thereto by means of one or more feathers 30 projecting inward from the sleeve in engagement with splines or grooves 31 formed longitudinally in the exterior of the thread-bar crossing the threads thereof (see Figs. 11 and 12). The sleeve 29 is driven by means of a pinion 32 meshing with the driving gear 28 and compounded with a gear 33 on a shaft 34 which passes through an opening 35 in the wall 6, the gear 33 being housed by the cover-plate 2 and meshing with a pinion 36 fixed to the end of the sleeve within the chamber between the cap 15 and the part 18. An outward extension on the shaft 34 may be used to drive connections leading to associated mechanisms if desired.

The thread-bar, see Figs. 11–19, has, in addition to the ordinary fine thread 135 for feeding purposes, a deeper thread 136 of much steeper pitch than the feed thread and running in the reverse direction. This thread coöperates with a dog 37 at the end of the playing of the record, the feed-nut 22 being simultaneously disengaged from the fine thread, so that by the continued rotation of the record support in the same direction as previously, the record and its support are caused to move outward to normal position, where the record may be removed and a new one inserted onto the drum through an opening 38 in the side of the doll provided for the purpose. In this operation the engagement of the dog 37 with the return thread opposes the thrust exerted by pushing the record onto its support, and thus holds the latter against displacement. When the record drum is returned to starting position, in the manner described, the mechanism is automatically stopped by the frictional engagement of a surface 39 on the outer end face of the drum with the inner face of a brake disk 40, which is screwed to the end of the fixed axle, this disk also preventing the record support from slipping out. The return thread preferably terminates in an annular groove or transverse channel 137, which may be even deeper than the thread, the parts being so proportioned that the return dog enters the groove 137 at the moment when the outward travel of the drum causes it to press frictionally against the brake disk, so that the drum is held firmly against the brake and is enabled to offer even firmer resistance to the thrust of the insertion of a new record than it would if the dog were still in the spiral portion of the return groove when the mechanism is brought to rest. The feed-nut 22 and the return dog 37 are also received within the record drum, being preferably located at the outer or forward end of the spring driving means; and their engagement and disengagement with the threads of the thread-bar are effected by means extending between the spring motor and the drum and also adapted to be encircled by the latter, the said means being most advantageously in the nature of an oscillatory member coaxial with the spring motor, the record support and their shafts. In the preferred construction illustrated in the drawings, the said member consists of a cup 41 inclosing the spring barrel and having a basal flange 42 which is rim journaled in a circular recess in the outer face of the plate 8 of the gear casing 10. The nut and dog are housed between the end wall 43 of the cup and the end of the spring barrel, or between the said wall and a fixed plate 44 screwed to the outer end of the hollow axle and constituting the support for the said members, which are pivoted thereto at 45 and 46, respectively, as shown more particularly in Figs. 6, 7, 10. The nut and dog also have connection with the movable wall 43 of the cup, so that they are shifted into and out of engagement with the threads of the thread-bar by the relative movement between the parts 43 and 44, it being manifest that in the construction illustrated the same results may be secured irrespective of which of the two parts supports the nut and dog, provided these elements have connection with both.

As shown more particularly in Figs. 9 and 10, the nut and dog are fixed to or formed on arms 47 and 48, pivoted as aforesaid and disposed at opposite sides of the thread-bar. Their free ends engage with the oscillatory wall 43 as by means of pins 49 and 50 projecting through openings in the latter, and are connected by a spring 51, which holds the said pins against the portion 52 of the wall 43 between these openings. It will be perceived that the part 43 in effect comprises a member interposed between the dog and nut and operating in conjunction with the spring 51 to move and hold them in proper relation. As illustrated in Fig. 9 the width of the spacing portion 52 is such that in a midposition both the nut and dog are disengaged from the threads, so that the thread-bar and the record support may be slipped out, the disk 40 being removed for the purpose. The oscillatory cup 41 may be removably held in place by one or more screws 53 threaded into the fixed member or plate 44 and projecting through slots 54 in the cup wall 43, the heads of the screws overlying the outer faces of this wall.

The oscillatory member 41 is urged in one direction, preferably that required to engage the dog and to disengage the nut, by means of a spring 55 which may also be advantageously housed in the chamber within the end of the cup, where it connects one of the fixed screws 53 with a screw 56 on the cup. An automatic detent 57 serves to hold the said member against the action of this spring, with the nut in operative position and the dog removed from the return thread. When the detent is released, the spring 55 shifts the cup and reverses this condition, the extent of movement due to the spring being limited by a suitable stop, such as that afforded by opposing shoulders 58 on the flange 42 and plate 8. Manual means is provided whereby the oscillatory member 41 is moved to engage the feed dog, while automatic means actuated by or connected with the record support causes movement of the member in the opposite direction to remove the nut and bring the return dog into action at the end of the record, that is to say, when the record drum has been fed to the point nearest the main supporting structure. One of these means acts directly upon the oscillatory member and the other upon the detent 57 to disengage the same.

With the spring 55 operative to move the oscillatory member to reversing position, as described, the starting device is connected to the member, and the drum-actuated means co-acts with the detent. In the particular construction shown, the starting device is desirably in the form of a push link 59 pivoted to the flange 42 of the cup to project through a suitable opening in the front of the doll, at the outer side of which it is provided with a head 60. The detent-tripping means may consist simply of a low projection 61 on the basal flange 62 of the record drum, the same being arranged so as to strike against the side of the detent 57 and thereby force the bent end 63 thereof away from the notch or shoulder 64 in the flange 42, with which it automatically engages when the link 59 is pushed inward.

Preferably, a spring-pressed reproducer 65 of the construction disclosed in Patent No. 1,097,771, dated May 26, 1914, to ourselves, is mounted slidably in a sleeve 66 mounted on a stationary reproducer bracket 67 projecting from the main supporting structure in the same general direction as the bearing axles of the record drum and spring motor, the bracket being conveniently secured at its inner end by screws 68 to the circular periphery of the gear case 10. The detent 57 heretofore described is preferably mounted on this bracket and actuates means for moving the reproducer in relation to the record. An exceedingly simple construction is secured by the provision of a single rock member, comprising a shaft 69 journaled in a lug 70 on the bracket 67 and bearing at one end the detent arm 57 and at the other end a fork 71 adapted to bear against pins 72 projecting from the neck 73 of the reproducer, so that the latter may be moved away from the record against the action of the compression spring 74, which tends to hold the reproducer point 75 against the record. A spring 76, encircling the shaft 69 and secured at opposite ends to the shaft and to a fixed part, serves to move the rock member in the direction which causes the detent 57 to drop into its notch 64 and to release the pressure of the fork 71 on the pins 72, with the result that the reproducer is brought into action. An incline or cam surface 77 cut in the periphery of the flange 42 of the cup and terminating at the shoulder 64 enables the turning of the cup under the action of its spring 55 to complete the reverse movement of the rock member 57, 71 after the detent portion thereof has been shifted a certain distance by the tripping projection 61 on the record drum, and also eases the approach of the reproducer point toward the record when the cup is turned in the opposite direction by the starting device 60.

The axis of rotation of the rock member 57, 71, it will be observed, is parallel to the axis of the oscillatory member 41 and the parts co-axial therewith, and this fact, together with the mounting of the rock member on the reproducer bracket, makes it a simple matter to position the spring-pressed reproducer at substantially any point around the record that may be desired, this range of choice in the matter of locating the reproducer being made possible by the general co-axial construction of the apparatus, which avoids the presence of other structural or operative parts in locations where they would necessarily interfere with any particular position which might be selected for the reproducer and its support. In other words, the parts over or opposite to which the reproducer and reproducer bracket are disposed are included within the geometrical surface which would be generated by the revolution of the inner line of the reproducer and bracket about the main axis of the machine.

In the particular construction illustrated, the reproducer is located below the record support or, in reference to the doll, at the side of the record support remote from the head. The sound-conveyer or horn 78, which is properly supported and has telescopic connection at its free end with the sleeve 66, is shown provided adjacent this end with a return bend, from which the horn extends and flares upward behind the record support, and is finally directed forward over the same in an appropriately flaring mouth, so that the sound-conveyer is in effect curved about the record, thus making possible a horn of suitable length disposed in such manner as to occupy an extremely small amount of space.

Manifestly the form and arrangement of the horn, and the direction in which it is caused to extend, may be widely varied, according to the particular acoustic effect desired or the conditions imposed by the shape or size of the space, or container, or cabinet in which the apparatus is to be housed. The arrangement shown is more especially adapted for a space such as the interior of the doll body, which is comparatively high in reference to its other dimensions, but it will be understood that by suitable variations the apparatus is equally adaptable to horizontally-extending spaces or interiors of practically any form. In the case of a doll, the front wall of the body opposite the mouth of the sound-conveyer is provided with an opening 79 for the escape of the sound.

Dual winding means are provided for the spring motor. One means comprises a crank handle 80, which may be applied to the shaft of a winding pinion 81 disposed in a recess in the annular plate 4 and meshing with the winding gear 27. The other winding instrumentality comprises a spring tape device 82 operated by repeatedly pulling upon a tape 83, as more particularly shown in Figs. 14 and 15. This device comprises a rotatable drum 84 inside a stationary cover 85. The tape is secured at one end to this drum and is coiled between the periphery thereof and the peripheral wall of the cover. A spring 86 is coiled inside the drum and secured at opposite ends to the drum and to a head 87 fixed to an axle 88, the latter being screwed at one end into the plate 6 and at the other end receiving a nut 89 to hold the cover plate 85 in place. The drum 84 is fixed to a pinion 90 journaled on the axle and meshing with a gear 91 within a gear case 92. The said gear 91 is mounted to rotate about and relatively to the shaft 93 of the crank winder, and is adapted to have one-way driving connection therewith through the instrumentality of a pawl 94 on the gear and a coöperating ratchet 95 on the said shaft. Thus, when the tape 83 is pulled outward, the drum 84 is rotated, the spring 86 is tensioned, and the gear 91 is turned in such direction that its pawl has driven engagement with the ratchet. When the tape is released, the spring 86 winds the amount drawn out back into the casing 85 and turns the gear 91 in the reverse direction, but without affecting the winder shaft, because the pawl rides idly over the teeth of the ratchet.

In place of the ordinary ratchet mechanism for preventing backward rotation of the winding gear 27 of the driving spring, an improved construction is provided, which is equally effective and less liable to breakage, this being an important feature because the breaking of the holding dogs is a common cause of serious damage to talking machines. The improved construction comprises an arrangement of balls interposed between the winding gear and a stationary part and acting under the influence of springs, in conjunction with inclined surfaces on one or both of the parts to prevent retrograde movement of the gear. The preferred embodiment of this device is illustrated in Figs. 21, 22 and 23 wherein 96 represent recesses with inclined bottoms formed in the inner face of the wall 8 of the gear case and 97 balls received partly in these recesses and partly in a continuous circular groove 98 inside of the winding gear. Fine helical springs 101 are disposed in the deeper parts of the recesses 96, so as to bear at one end against the end walls thereof and at the opposite end against the balls, these springs being of such length as to hold the balls yieldingly sufficiently far up on the inclines 100 so that they will contact simultaneously with these inclines and with the bottom or walls of the groove in the gear. The inclination of the bottoms of the recesses 96 is so arranged that during the rotation of the winding gear to wind the spring the relative movement between the gear and stationary wall tends to roll the balls toward the deeper portions of the recesses against the pressure of the springs 101, but as soon as the winding effort is relaxed these springs immediately urge the balls to positions where the tendency of the gear to turn backward wedges them against the incline, and thereby effectually blocks the gear. The side thrust which is thus imparted to the winding gear is transmitted to a flange or shoulder 102 projecting inward from the peripheral casing member 4 and separating the winding and driving gears from each other.

The governor 103 within the governor casing 11 is shown driven from the gear 33 through a pinion 104 meshing with this gear and compounded on a shaft 105 with a gear 106, the latter in turn meshing with a pinion 107 on the governor staff 108. The governor is illustrated more particularly in Figs. 16, 17, 18, where it is shown as comprising two opposite arms 109 pivoted at 110 in slots formed in opposite ends of a cross-piece 111 fixed to the staff 108. Opposed weights 112, each somewhat less than semi-circular, are slotted to receive the arms, to which they are pivotally connected by pins 113. Transverse spiral springs 114 connect the weights and arms in such manner as to oppose the outward movement thereof under centrifugal action; and a construction at once simple and effective is secured by inserting the ends of these springs in parallel openings in the weights at opposite sides of the arms and by causing the pins 113 to traverse these openings, so as to engage the convolutions of the springs and thereby secure the latter to the weights. The arms are provided with shoulders 115, which, upon the outward movement of the weights, act upon lateral extensions 116 of a sleeve 117 slidably mounted on the staff 108 and carrying at its other end a friction disk 118 to coöperate with an adjustment screw 119 having a suitable friction tip. When the weights and arms are moved toward each other, under the action of the springs 114, reversely arranged shoulders 120 engage with the opposite sides of the extensions 116, so as to move the friction disk away from the adjustable friction member.

Improved means are provided for holding the record on its support, the same comprising a friction clutch at the base of the drum operated solely by pushing the record into place. As illustrated more particularly in Figs. 19 and 20, the preferred embodiment of this clutch comprises one or more spring bands 121 fixed to the drum at spaced points, as by drops of solder 122, and being of such length as to project intermediate these points sufficiently to engage frictionally with the inner surface of the record when the latter is slipped into place. A flange 123 projects from the periphery of the drum a short distance in advance of the basal flange 62, so as to afford a channel for the reception of the clutch bands, and the latter are preferably provided with rounded knobs 124 constituting their highest portions. The record itself is formed at its inner end with an internal recess or rabbet 125 to accommodate the clutch. The inner surface of this recess upon encountering the knobs 124 forces the latter inward, with the result that the portions of the springs at the sides of the knobs are bowed outward, thereby affording a considerable area of contact between the clutch member and the record. The flange 123, it will be understood, is sufficiently low to clear the inner surface of the recessed portion of the record. A handle or handles 126, of appropriate form, are secured to the outer end of the record in such manner as to partially close the same, thereby preventing the possibility of inserting the record wrong end first. In the particular construction illustrated these handles are in the form of upwardly flaring wings, formed integral with or secured to an annular shell 127, having an outer cylindrical flange 128 molded into the body of the record and flush with the inner surface thereof. These handles, it will be observed, leave the central part of the end of the record unobstructed, so that the axle 12 and its brake disk 40 may project therethrough.

What we claim as new is:

1. In phonograph mechanism, the combination of a driving spring, a hollow cylindrical record support rotatable by and in encircling relation to said spring, and means for feeding the record support over the spring.

2. In phonograph mechanism, the combination of a driving spring barrel and a rotatable and axially movable record support in telescopic relation thereto.

3. In phonograph mechanism, the combination with a support and an axle projecting therefrom, of a record drum supported by said axle, a driving spring accommodated within said record drum, and coaxial winding and driving gears connected with the spring interposed between the same and said support.

4. In phonograph mechanism, the combination with a support, and fixed axles projecting therefrom one within the other, of a thread-bar mounted on the inner axle and carrying a record drum, and spring driving mechanism mounted on the outer axle.

5. In phonograph mechanism, the combination with fixed axles one within the other, of a thread-bar on the inner axle, a record drum carried by the thread-bar, a feed-nut coöperative with the thread-bar, a rotary sleeve inside the outer axle having slidable driving connection with said thread-bar, and means mounted on the outer axle for driving said rotary sleeve.

6. In phonograph mechanism, a support having an opening, inner and outer axles projecting therefrom and having basal portions clamping the support between them, in combination with a record support supported by the inner axle, and driving means therefor supported on the outer axle.

7. In phonograph mechanism, a support having an opening, a hollow axle having a basal portion, an inner axle having a cap, said basal portion and cap clamping against opposite sides of the support adjacent the opening and the one having a flange telescoping with the other to center the axles in relation to each other, and means for drawing said basal portion and cap together, in combination with a record support supported by the inner axle, and driving means therefor supported on the outer axle.

8. In phonograph mechanism, a support having an opening, inner and outer axles projecting therefrom and having basal portions clamping the support between them, one of said basal portions having a centering flange fitting said opening and also fitting into a recess in the other basal portion, in combination with a record support supported by the inner axle, and driving means therefor supported on the outer axle.

9. In phonograph mechanism, a support having an opening, a hollow axle having a basal portion, and an inner axle having a cap, said basal portion and cap clamping against opposite sides of the support adjacent the opening and inclosing a chamber between them, in combination with a record support supported by the inner axle, a hollow member between the axles for driving said record support, said member carrying a gear within said chamber, and means on the outer axle for driving said gear.

10. In phonograph mechanism, spring driving means having a central opening, a thread-bar operative within said opening, a record drum secured to said thread-bar at one side of the spring driving means, gearing at the opposite side thereof having splined connection with said thread-bar, and a feed-nut coöperative with the thread-bar.

11. In phonograph mechanism, spring driving means having a central opening, a telescoping driving connection extending through said opening, one member of which is a thread-bar splined to the other, and a record drum secured to said thread-bar.

12. In phonograph mechanism, an axle, spring driving means thereon, a co-axial thread-bar, a feed-nut carried by said axle, and a record drum secured to the thread-bar.

13. In phonograph mechanism, a hollow axle, spring driving means encircling the same, a thread-bar operative within said axle and driven by said means, a plate on the end of the axle, and a feed-nut having movable connection with said plate.

14. In phonograph mechanism, spring driving means, a cup encircling the same, a thread-bar passing through the end wall of the cup and within the spring driving means, by which it is driven, a record drum connected to the thread-bar, and a feed-nut housed between said cup and the spring driving means.

15. In phonograph mechanism, a hollow axle, a spring barrel encircling the same, a cup encircling the spring barrel, a member fixed on the axle between the end of the cup and the spring barrel, a feed-nut having connection with said member, and a thread-bar telescoping within said axle in coöperative relation to the feed-nut.

16. In phonograph mechanism, spring driving means, a record drum rotatable around said driving means, a central thread-bar connected to the record drum, an oscillatory cup disposed co-axially between said spring driving means and record drum, a fixed member, and a feed-nut having connection both with the cup and said fixed member and movable by the former relatively to the thread-bar.

17. In phonograph mechanism, spring driving means, an oscillatory member encircling said spring driving means, a record drum rotatable and movable axially over said spring driving means and member, a thread-bar connected to said record drum, and a feed-nut coöperative with said thread-bar and movable relatively thereto by said oscillatory member.

18. In phonograph mechanism, spring driving means having a central opening, an oscillatory member encircling said spring driving means, a record drum rotatable and movable axially over said spring driving means and member, a thread-bar connected to said record drum and operative in the central opening in said spring driving means, gearing connecting said means with the thread-bar and having slidable connection with the latter, a fixed member, and a feed-nut having connection with said oscillatory member and fixed member and movable by the former relatively to the feed-bar.

19. In phonograph mechanism, spring driving means, a record drum co-axial therewith, a thread-bar connected to the record drum, a feed-nut coöperative with the thread-bar, an oscillatory member encircling the spring driving means to control said feed-nut, a spring tending to turn said member in one direction, a detent for holding said member against the action of said spring, a starting device whereby the member may be caused to turn in one direction, and means connected with the record drum whereby the member is caused to turn in the opposite direction.

20. In phonograph mechanism, a support, bearing means projecting therefrom, spring driving means and a co-axial thread-bar supported by said bearing means, a feed-nut coöperative with the thread-bar, and an oscillatory member encircling said spring driving means and journaled at one end on said support and at the other end having means for actuating said feed-nut.

21. In phonograph mechanism, a support, bearing means projecting therefrom, spring driving means and a co-axial thread-bar supported by said bearing means, a feed-nut coöperative with the thread-bar, and an oscillatory member encircling said spring driving means and having at one end a flange rim journaled in said support and at the other end means for moving said feed-nut.

22. In phonograph mechanism, spring driving means, a co-axial thread-bar, an oscillatory cup encircling said spring driving means, a fixed member within said cup, a feed-nut pivotally mounted on one of the two last-mentioned elements and adapted to be engaged by the other, a spring connecting said elements and tending to turn the cup, and a detent operative to hold the cup against the action of the spring.

23. In phonograph mechanism, spring driving means, a co-axial thread-bar, a record drum connected thereto, an oscillatory cup encircling said spring driving means, a fixed plate opposed to the end wall of said cup, a feed-nut between and having connection with said plate and wall, and a spring between and connecting said plate and wall for turning the cup.

24. In phonograph mechanism, spring driving means, a record drum co-axial therewith, a thread-bar connected to the record drum, a feed-nut coöperative with the thread-bar, an oscillatory member encircling the spring driving means to control said feed-nut, a spring tending to turn said member in one direction, a detent for holding said member against the action of said spring, a starting device connected with said member to turn the same in one direction, and means connected with the record drum for tripping said detent.

25. In phonograph mechanism, the combination of a record drum, a reproducer movable toward and from said drum, a thread-bar connected with the drum, a feed-nut coöperative with the thread-bar to produce relative longitudinal movement between the drum and reproducer, a member movement of which in opposite directions causes engagement and disengagement, respectively, of the feed-nut with the thread-bar, a spring tending to move said member in one direction, a starting device for moving said member in the opposite direction, a detent for holding said member against the action of the spring, means on the record drum for tripping said detent, and a connection between said detent and the reproducer.

26. In phonograph mechanism, a record drum, a reproducer, a thread-bar and a feed-nut for producing relative longitudinal movement between the record drum and reproducer, of an oscillatory member encircling the thread-bar for controlling said feed-nut, and a rock-shaft journaled in a bearing parallel with the feed-bar and having an arm at one end constituting a detent for engagement with the oscillatory member and at the other end a fork to engage the reproducer.

27. In phonograph mechanism, spring driving means, a thread-bar driven thereby, a feed-nut coöperative with said thread-bar to move the same longitudinally, a record drum secured to the thread-bar in encircling relation to the spring driving means, an oscillatory member encircling the spring driving means within the record drum to control said feed-nut, a spring urging said oscillatory member in one direction, starting means for moving it in the other direction, a rock member mounted to turn on an axis parallel to the oscillatory member and constituting a detent adapted to engage automatically therewith, a reproducer also controlled by said rock member, and means on the record drum for tripping said rock member.

28. In phonograph mechanism, the combination of a record drum, a reproducer, a thread-bar having a feed thread and a reverse thread, a feed-nut engageable with the feed thread, a dog engageable with the reverse thread, and an oscillatory member encircling the thread-bar for alternately engaging the feed-nut and dog with the respective threads.

29. In phonograph mechanism, the combination of a record drum, a reproducer, a thread-bar having a feed thread and a reverse thread, a feed-nut engageable with the feed thread, a dog engageable with the reverse thread, a member encircling the thread-bar and on which said nut and dog are pivoted, a second member encircling the thread-bar and having portions engaging said nut and dog, a spring connecting said nut and dog and holding them against said portion, and means for producing relative oscillation between said members.

30. In phonograph mechanism, an axle, a thread-bar thereon having a feed thread and a reverse thread deeper and steeper than the feed thread, the thread-bar also being formed with an external spline, a rotary driving member encircling the thread-bar and having a feather engaging said spline, a record drum carried by the thread-bar, a feed-nut engageable with the reverse thread to return the record support to normal position, and a brake member on the end of the axle adapted to arrest the rotation of the thread-bar and drum.

31. The combination of a rotatable and axially fed record drum, a thread-bar connected thereto, a feed-nut, an oscillatory member co-axial with the thread-bar for controlling said feed-nut, a reproducer, and a member rockable about an axis parallel to the axis of the feed-bar and connecting the reproducer with said oscillatory member.

32. In phonograph mechanism, the combination of a support, a record drum supported thereby for rotation and axial movement, a thread-bar connected to said drum, a feed-nut, an oscillatory member co-axial with the thread-bar for controlling said feed-nut, a reproducer bracket secured to the support, a reproducer on said bracket, and a member mounted on said bracket for connecting the reproducer with said oscillatory member.

In witness whereof, we have hereunto set our hands this 29th day of June, 1914.

WILLIAM ROTTER.
RICHARD S. ARTHUR.

In the presence of—
ROBERT C. BIRKHAHN,
CLARENCE G. GALSTON.